April 26, 1960 H. F. FISHER 2,933,769
EXTRUSION OF PLASTIC ONTO A MANDREL
Filed Sept. 30, 1955
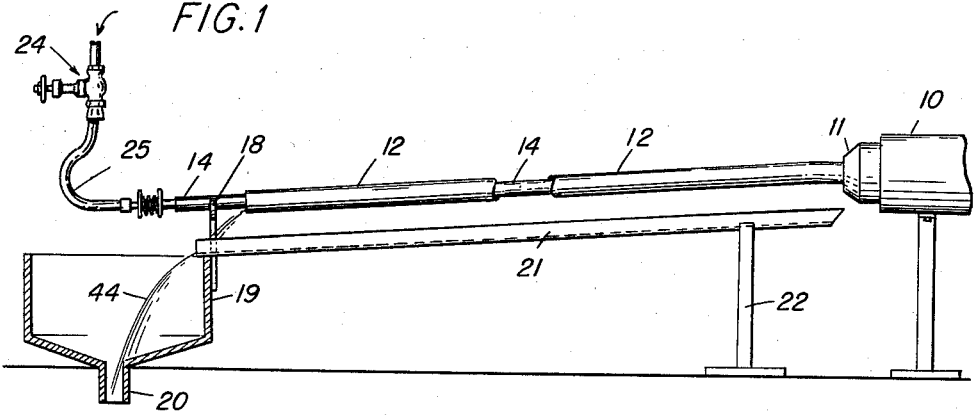
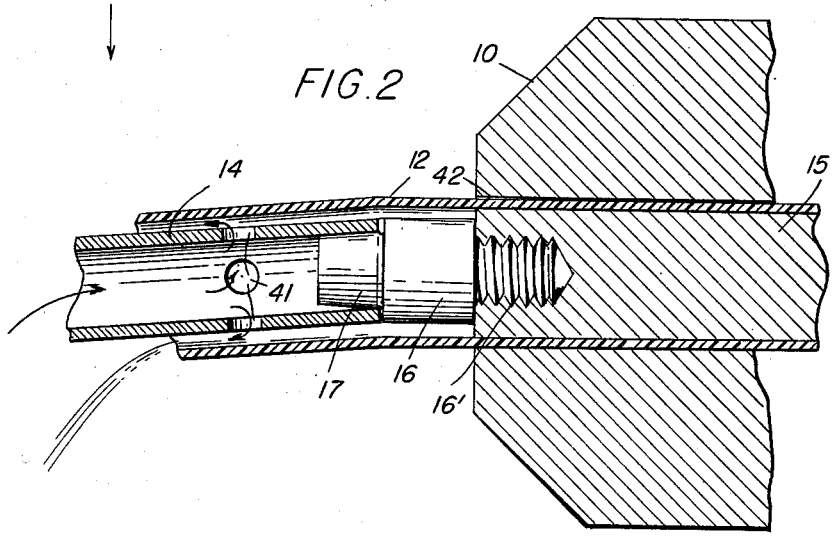
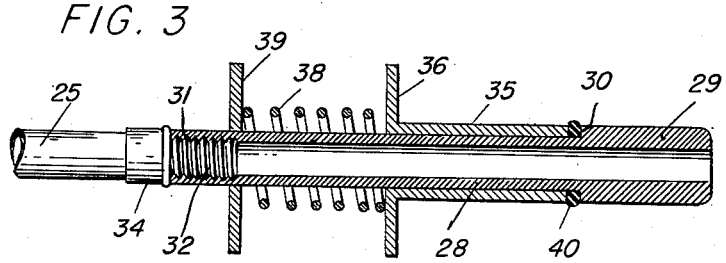
INVENTOR.
Harold F. Fisher
BY
Churchill, Riel, Weymouth & Engel
Attorneys

United States Patent Office 2,933,769
Patented Apr. 26, 1960

2,933,769

EXTRUSION OF PLASTIC ONTO A MANDREL

Harold F. Fisher, Nutley, N.J., assignor to Resistoflex Corporation, Belleville, N.J., a corporation of New York Application September 30, 1955, Serial No. 537,723

4 Claims. (Cl. 18—55)

This invention relates to the extrusion of hollow plastic articles such as tubing.

In the manufacture of extruded articles of polytetrafluoroethylene (better known by its trade name "Teflon," which term will hereinafter be used) one of the methods used is so-called "paste extrusion." This process involves making a so-called paste by mixing fine Teflon powder with a volatile liquid, preferably first pressing the mixture into preforms and then extruding the preforms or otherwise extruding the paste through a die orifice to form tubing. The freshly extruded product is quite soft and must be handled with extreme care and supported until it has been baked to evaporate the volatile components and sintered, which converts the extruded paste into a very tough, self-sustaining material. In the co-pending application of Alton S. Vanderhoof, Serial No. 492,896, now Patent No. 2,889,581, an extrusion method is disclosed wherein the tubing is extruded into a pipe by which it is supported and protected. This process, however, is not applicable to the larger sizes of tubing, the so-called −10 size being the largest which can, as a practical matter, be extruded into a pipe. Sizes of −10 and larger require some internal support and so the tubing is preferably extruded onto a rigid mandrel. It will be understood that when a mandrel of the desired length is completely covered with the freshly extruded tubing, the tubing is cut off at the extruder end and the product on the mandrel may then be transported, while still on the mandrel, to an oven for sintering and a new mandrel placed in position to receive the next length of extruded tubing. It will be further understood that although the invention is exemplified by reference to the process of extruding Teflon, it is equally applicable to the extrusion of any other plastic material which requires support while in a soft or delicate condition or until it has passed through some subsequent processing steps.

Heretofore the extrusion of Teflon tubing onto a mandrel has presented a difficulty in that not more than three or four feet of tubing in its soft condition can be extruded on a mandrel in perfect condition because friction has prevented making longer lengths. Short lengths are not only uneconomical to produce but many uses require tubing of much greater length than three or four feet. Other difficulties are that the frictional drag of the tubing as it slides over the mandrel seriously limits the maximum speed of extrusion and causes defects and deformities in the soft material.

The principal object of the present invention is to provide a method whereby plastic tubing may be extruded on mandrels as long as may conveniently be handled and at a maximum rate of speed.

A more specific object is to provide an improved method of extruding Teflon tubing.

Other objects and advantages of the invention will in part appear and in part will be obvious from the following detailed description of the present preferred embodiment of the invention.

According to the invention, means are provided whereby a constantly flowing stream of liquid is supplied within the extruded tubing and around the mandrel from a point close to the end of the mandrel which is adjacent the extruder. This flowing liquid serves to lubricate the outside of the mandrel and tends to float the freshly extruded tubing along its outer surface, substantially eliminating frictional drag. It also protects the inner wall of the tubing against damage from slight irregularities on the surface of the mandrel, such as scratches, dents, corrosion roughness and the like.

The invention will best be understood by reference to the drawings in which:

Fig. 1 is an elevation, more or less diagrammatic, of one form of apparatus suitable for practicing the invention;

Fig. 2 is an enlarged detail, mostly in central vertical section, of the orifice end of an extruder and the end of the mandrel adjacent thereto showing means for coupling the mandrel to the extruder for support; and Fig. 3 is a central sectional elevation of a removable self-sealing plug by which fluid connection may be made to the end of a hollow mandrel.

Referring to Fig. 1, it shows the front end of an extruder 10 having a nozzle 11 with the extruded tubing 12 flowing therefrom onto a suitable rigid mandrel 14 such as metal tubing. The mandrel is preferably supported at a slight inclination to the horizontal in the following manner.

Referring to Fig. 2, the center die 15 in the orifice of the extruder nozzle 10 is drilled and tapped to receive the threaded shank 16' of a plug 16 which has a reduced and preferably tapered end 17. The larger base of the end 17 has a diameter corresponding to the inside diameter of mandrel 14 and the taper is provided to facilitate the positioning of the upper end of the mandrel thereon. The lower end of the mandrel is supported on a bracket 18 attached to the rim of a catch basin 19 having a bottom outlet 20 which may communicate with a drain or fluid reservoir.

Parallel with the mandrel 14 and beneath it is a trough 21 extending from extruder nozzle 11 into catch basin 19. It may be supported at its upper end on a rest 22 and at its lower end in the wall of the catch basin into which it discharges.

When mandrel 14 is in position ready to receive extruded tubing, as shown in the drawings, its lower end is connected to a fluid supply line, for example at valve 24, preferably through a flexible hose connection 25 carrying at one end the removable self-sealing plug shown in Fig. 3 which will now be described.

The tubular cylindrical body 28 has an enlarged end 29 providing a shoulder 30 and at the other end is threaded internally at 31 to receive the threaded nipple 32 of the hose end fitting 34. Slidably mounted on body 28 is a tubular sleeve 35 having a flange 36 against which bears the coil spring 38. After the sleeve 35 and spring 38 have been assembled on body 28 the fixed flange 39 is permanently or otherwise secured to body 28 as by brazing or by a threaded connection, as may be desired, to put spring 38 under substantial compression. It will thus be seen that spring 38 urges sleeve 35 toward shoulder 30 and between this sleeve and shoulder there is a resilient O-ring 40 which will be compressed by the action of the spring, as shown, expanding it radially outward. The head 29 is sized to have a clearance fit with the inside of the mandrel and by drawing back on flange 36 pressure on O-ring 30 is released and the plug may be easily and quickly inserted in the end of the mandrel after which release of the flange will cause the O-ring to be compressed into contact with the inside wall of the mandrel, thus effecting a fluid-tight seal.

As may be seen in Fig. 2, the upper end of the mandrel 14 adjacent the end of plug 16 is provided with a plurality of openings 41. It will be evident that if valve 24 is opened, liquid, such as water, assumed to be under pressure, will flow into the lower end of the mandrel and out of the openings 41 inside of tubing which is being extruded over the mandrel, having flowed thereover from the extrusion orifice 42. The water supply may be initiated after sufficient tubing has been extruded to cover the openings 41 and extend slightly beyond them. Up to this point frictional resistance will not have developed. From this point on the flow of water inside the tubing in effect floats it along the mandrel and keeps it out of frictional engagement therewith. As the tubing progresses along the mandrel the fluid will run out of the end of the tubing into trough 21 and be conveyed into the catch basin 19. The flow of fluid out of the lower end of the tubing and into trough 21 and thence into the catch basin 19 and through its outlet 20 is indicated at 44.

When the mandrel has been nearly covered with tubing, extrusion is stopped, valve 24 is closed and the tubing severed just short of the upper end of the mandrel. The mandrel may then be picked up by its ends, without touching the soft tubing, and conveyed to a sintering oven.

By the means and process above described Teflon tubing up to twenty feet or more in length may easily be extruded at whatever rate of speed the extruder is capable of producing it. The rate of fluid flow inside the tubing should be adjusted so that an adequate floating action is secured but pressures which would be sufficient to expand the freshly extruded tubing should be avoided.

Since the foregoing description is given merely for purposes of illustration it is to be understood that the invention is not limited to the details thereof which are subject to many modifications.

What is claimed is:

1. In the making of polytetrafluoroethylene tubing of substantial length by extrusion from paste and thereafter heating to sintering temperature, the steps of extruding the tubing onto a hollow metal mandrel having substantial length, an outer diameter throughout said length slightly smaller than the inner diameter of the tubing, and one end removably supported adjacent the extruder nozzle with the mandrel at a slight angle to the horizontal; maintaining between said mandrel and the tubing as the latter is extruded a constantly flowing stream of liquid flowing from adjacent the extruder nozzle to the unobstructed open end of the extruded tubing of a quantity sufficient to prevent damaging engagement between the tubing and the mandrel and to have the tendency to float and convey the tubing therealong; discontinuing the extrusion and said flow of liquid before the length of the tubing exceeds the length of the mandrel; severing the length of tubing on the mandrel; and sintering the tubing on the mandrel.

2. The method of overcoming frictional resistance to the extrusion of an elongated tube onto a hollow metal mandrel of smaller diameter than the tubing which comprises disposing the mandrel at a slight angle to the horizontal, continually injecting liquid into the lower end of the mandrel to flow out of its higher end inside the tube being extruded thereon and back out the leading end of the tube in sufficient quantity to maintain a constantly flowing stream of liquid between the tube and the mandrel sufficient to tend to float the tube therealong, whereby the tube moves along the mandrel substantially out of direct contact therewith.

3. The method of extruding long lengths of polytetrafluoroethylene tubing from paste which comprises, providing a hollow metal mandrel of less outer diameter than the inside diameter of the tubing, supporting the mandrel at a slight angle to the horizontal with one end in alinement with the extruder to receive the tubing as it is extruded and the other end slightly lower, and maintaining a flow of liquid through the mandrel in a direction opposite to the movement of the tubing, out of the mandrel inside the tubing, and back in the direction of extrusion out the open end of the tubing to produce a flowing stream between the tubing and the mandrel sufficient in volume to tend to float the tubing therealong and to maintain the tubing substantially out of frictional engagement with the mandrel.

4. The method of claim 3 wherein said liquid is water.

References Cited in the file of this patent
UNITED STATES PATENTS

| | | |
|---|---|---|
| 1,601,686 | Henderson | Sept. 28, 1926 |
| 2,437,625 | Taylor | Mar. 9, 1948 |
| 2,446,281 | Harding | Aug. 3, 1948 |
| 2,537,977 | Dulmage | Jan. 16, 1951 |
| 2,562,135 | Strobel | July 24, 1951 |
| 2,597,553 | Weber | May 20, 1952 |
| 2,688,768 | Rayburn | Sept. 14, 1954 |
| 2,708,772 | Moncrieff | May 24, 1955 |
| 2,752,321 | Heller | June 26, 1956 |
| 2,752,637 | Walker et al. | July 3, 1956 |

FOREIGN PATENTS

| | | |
|---|---|---|
| 592,127 | Great Britain | Sept. 9, 1947 |